United States Patent [19]
Yamamoto

[11] Patent Number: 5,971,886
[45] Date of Patent: Oct. 26, 1999

[54] TOROIDAL-TYPE CONTINUOUSLY VARIABLE TRANSMISSION

[75] Inventor: Hideharu Yamamoto, Fuji, Japan

[73] Assignee: Jatco Corporation, Fuji City, Japan

[21] Appl. No.: 08/956,292

[22] Filed: Oct. 23, 1997

[30] Foreign Application Priority Data

Oct. 31, 1996 [JP] Japan ................................. 8-290493

[51] Int. Cl.$^6$ ................................................. F16H 15/38
[52] U.S. Cl. ................................................. 476/10; 476/42
[58] Field of Search ................................. 476/10, 40, 42

[56] References Cited

U.S. PATENT DOCUMENTS

5,395,292  3/1995  Fellows et al. ............................ 476/10

*Primary Examiner*—Allan D. Herrmann
*Attorney, Agent, or Firm*—Foley & Lardner

[57] ABSTRACT

A toroidal-type continuously variable transmission includes two sets of input and output disks, each set including an input disk, an output disk, a power roller, a carrier rotatably supporting the power roller with a tilt and rotation axis of the power roller slanted, and a cylinder device for the carrier. The cylinder device is disposed orthogonal to an axis of rotation of the input and output disks, and a carrier shaft mounted to the carrier along the tilt and rotation axis and a piston rod of the cylinder device are coupled by a joint. The joints of the two sets of input and output disks are connected by a link, and an elastic members are interposed between the link and the two cylinder devices, and an angle of each carrier shaft with respect to the link is made variable by the joint.

10 Claims, 4 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission, and in particular, to a mechanism for advancing and retracting a power roller disposed between an input disk and an output disk in frictional contact therewith, in a plane orthogonal to the axis of rotation of both the disks.

2. Description of the Related Art

A prior art toroidal-type continuously variable transmission is disclosed, for example, in Japanese Patent Laid Open Publication Hei No. 7-91512. This continuously variable transmission is a full toroidal-type continuously variable transmission of the double cavity type including two sets of input and output disks. Each of the two sets of input and output disks includes an input disk, an output disk disposed on the same axis of rotation as that of the input disk, a power roller disposed in a toroid-like groove formed by opposing surfaces of both the input and output disks so that the power roller is in frictional contact with both the input and output disks, a carrier for rotatably supporting the power roller and for slanting a tilt and rotation axis of the power roller by a predetermined angle with respect of an axis line orthogonal to the axis of rotation of both the input and output disks, and a cylinder device for advancing and retracting the carrier in a plane orthogonal to the axis of rotation.

Furthermore, in this continuously variable transmission, an axis line of the cylinder device is slanted in the tilt and rotation axis direction so that an axis line of a carrier shaft mounted on the carrier along the tilt and rotation axis is aligned with the axis line of the cylinder device on a straight line, and the carrier shaft and a piston rod are coupled by a universal joint.

However, in the prior art toroidal-type continuously variable transmission, in order to dispose the cylinder device on the axis line of the carrier shaft, it was necessary to fix the cylinder device on a housing or the like in a condition in which the cylinder device is slanted with respect to an axis line which is orthogonal to the axis of rotation of the input and output disks. Then in the toroidal-type continuously variable transmission, since three power rollers are usually disposed about the axis of rotation at equal intervals in a toroid-like groove formed by a pair of input and output disks, when this continuously variable transmission is of the double cavity type, a total of six power rollers will be provided. As a result, according to the above-mentioned prior art technique, it was necessary to fix each of the six cylinder devices with the same slant angle to the housing or the like. In order to set each cylinder device accurately with that slant angle, it is required to improve the common working and the working accuracy of respective cylinder bodies and the housing or the like for securing the cylinder bodies. However, there is a drawback that the accurate mounting of the cylinder devices is not easy. Furthermore, since each cylinder device is slanted, there is another drawback that the layout of the cylinder devices and their peripheral equipment becomes complicated.

SUMMARY OF THE INVENTION

The present invention was made in order to solve the drawbacks in the prior art, and its object is to make the mounting of the cylinder devices on the housing or the like accurate and easy. Another object is to protect the sealings of the cylinder devices by cancelling out the bending forces imparted to the piston rods of the cylinder devices from the carrier sides, so that the cancelling out is effected between two sets of input and output disks. Still another object is to eliminate a phase difference in the advancing and retracting of both the carriers of respectively corresponding to two sets of input and output disks, thereby to synchronize the advancing and retracting of both the power rollers which are frictionally in contact with both the input and output disks.

In order to achieve the object, in the present invention, a toroidal-type continuously variable transmission of the double-cavity type includes two sets of input and output disks, and each of the two sets of input and output disks comprises an input disk, an output disk disposed on the same axis of rotation as that of the input disk, a power roller disposed in a toroid-like groove formed by opposing surfaces of the input and output disks so that the power roller is frictionally in contact with both the input and output disks, a carrier for rotatably supporting the power roller so that a tilt and rotation axis of the power roller is slanted by a predetermined angle with respect to an axis line orthogonal to the axis of rotation of both the input and output disks, and a cylinder device for advancing and retracting the carrier in a plane orthogonal to the axis of rotation, and in a first aspect of the invention, the cylinder device is disposed orthogonal to the axis of rotation of the input and output disks, and a carrier shaft mounted to the carrier along the tilt and rotation axis is coupled with a piston rod of the cylinder device by a joint.

It is only necessary to work each mounting surface of the cylinder device and the transmission housing to which the cylinder device is fixed, at right angles or in parallel to the axis line of the cylinder device. Thus, there is no need to form a slanted mounting surface which is difficult to work with high accuracy. Accordingly, since it is possible to fix the cylinder device by using as a reference, a plane which is at right angles or in parallel and which is easy to work with high accuracy as mentioned above, the position of the joint between the carrier shaft and the piston rod can be determined accurately, and as a result, the tilt and rotation angle of the carrier can be set with high accuracy.

Furthermore, in a second aspect of the invention, the tilt and rotation axis of the power roller of one set of input and output disks and the slant and rotation axis of the power roller of the other set of input and output disks are disposed symmetrically about an axis line orthogonal to the axis of rotation of the input and output disks, and further, one joint connected to the carrier shaft of one set of input and output disks and the other joint connected to the carrier shaft of the other set of input and output disks are coupled with each other by a link which is in parallel to the axis of rotation of the input and output disks.

In this second aspect of the invention, since the joints of respective carrier shafts are coupled mechanically with each other, it is possible to synchronize the phases of both the carriers which advance and retract in the respective planes orthogonal to the axis or rotation and between respective sets of input and output disks. Moreover, since the respective tilt and rotation axes of both the sets are disposed symmetrically about the axis line orthogonal to the axis of rotation, the moment generated at each carrier due to a difference between the action line of a traction force exerted to the power roller and the action line of a thrust force of the cylinder device can be cancelled out mutually at the link.

In a third aspect of the invention, in addition to the feature in the first aspect of the invention, respective tilt and rotation axes of both the sets are disposed symmetrically about the axis line orthogonal to the axis of rotation, joints which are respectively connected to carrier shafts of both the sets of input and output disks are coupled with a link in parallel to the axis of rotation of the input and output disks, and furthermore, the cylinder devices for advancing and retracting respective carriers of both the sets are replaced by a single cylinder device and this single cylinder device is connected to the link.

Accordingly, since the single cylinder disk is used for advancing and retracting respective power rollers of both the sets, the structure is made simple and the phases of the carriers advanced and retracted by the cylinder device can be synchronized with each other.

In a fourth aspect of the invention, an elastic member is interposed between the link and the cylinder device to support the link thereby to form a dynamic damper utilizing the mass of the link.

Thus, pulsations of the liquid pressure supplied to the cylinder device, and vibrations caused by imbalance in the rotation of the power roller due to variations in the frictional force between the power roller and the input and output disks can be damped by the dynamic damper.

In a fifth aspect of the invention, an angle of the carrier shaft with respect to the link is made variable and the link is coupled with the joints.

Thus, even when the axial forces of the carrier shafts are changed between both the sets of input and output disks due to the imbalance in the traction forces exerted on respective power rollers of both the sets, this change can be absorbed by an angle change between the joints and the link.

DESCRIPTION OF THE PREFERRED EMBODIMENTS

Figure 1:
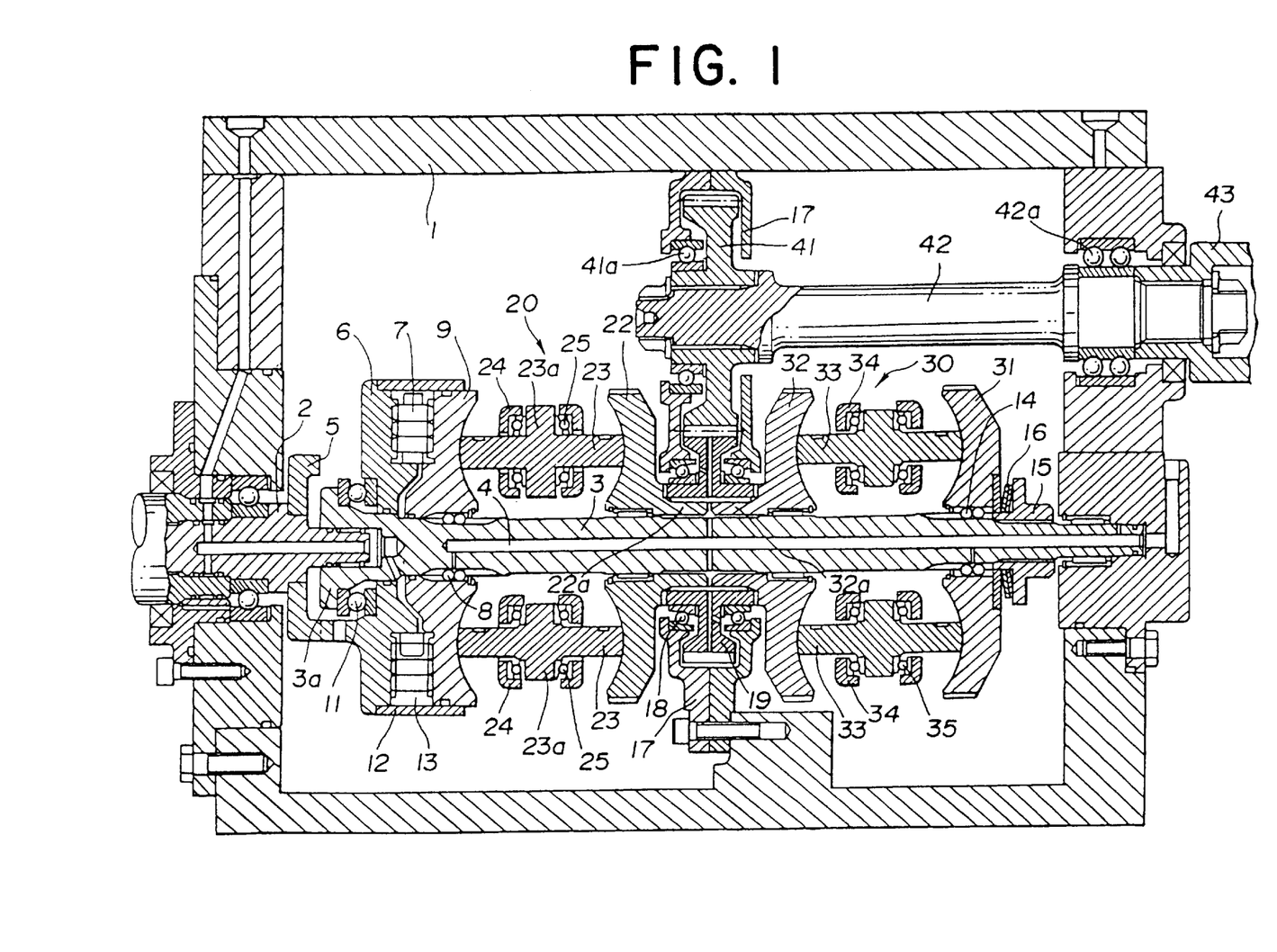
FIG. 1 is a plan-sectional view of a full toroidal continuously variable transmission in an embodiment of the present invention.
Figure 2:
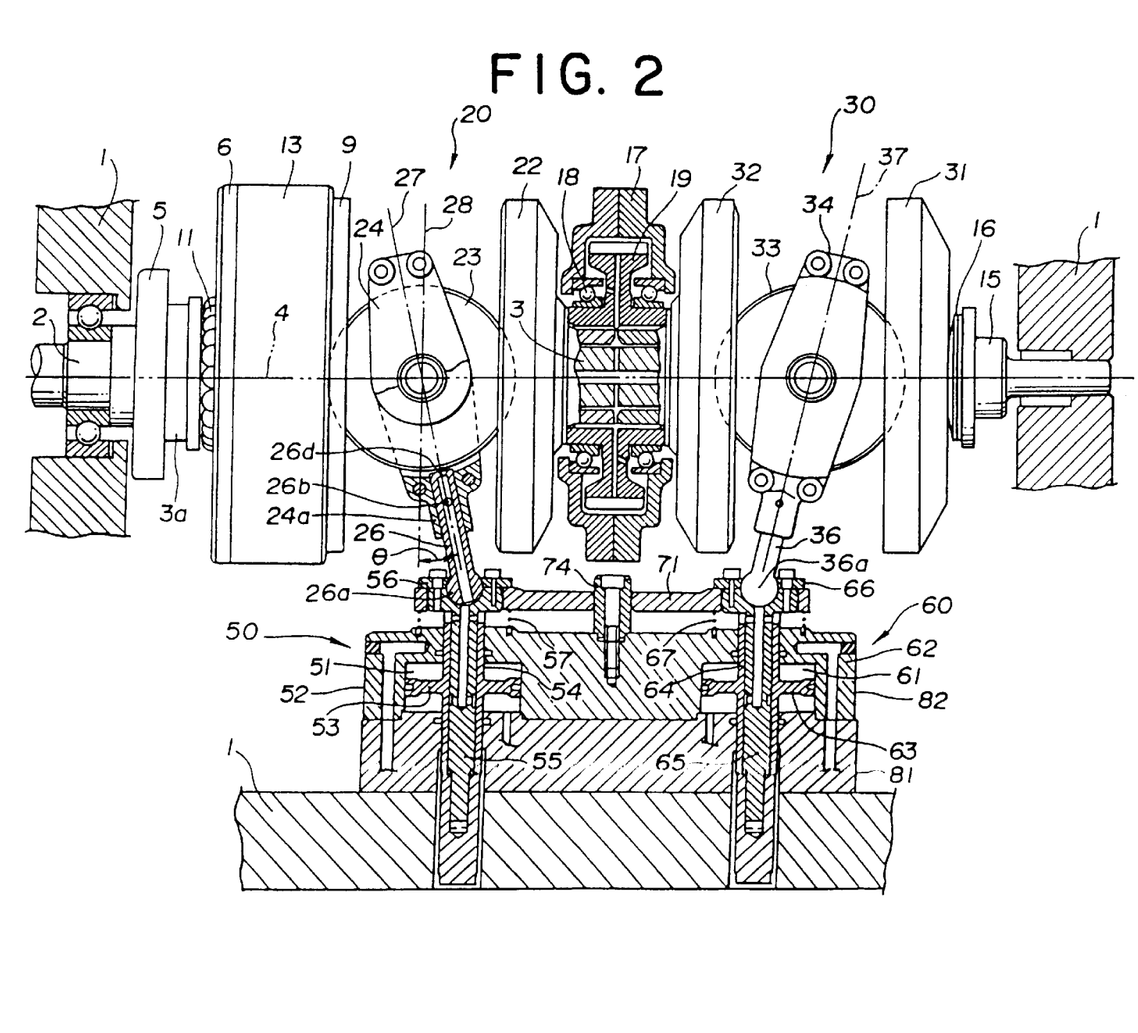
FIG. 2 as a partial front-sectional view of the full toroidal continuously variable transmission of FIG. 1.

FIGS. 1 and 2 show a toroidal continuously variable transmission of the present invention, in particular, a full toroidal continuously variable transmission to which the invention is implemented. As shown in FIG. 1, a first input shaft 2 and a second input shaft 3 connected thereto is mounted across a transmission housing 1. Both shafts 2 and 3 are disposed coaxially, and constitute a rotary shaft 4. Between both shafts 2 and 3, there are disposed with an input flange 5 fixed to the first input shaft 2, an input plate 6 engaged with the input flange 5 and fitted rotatably around the second input shaft 3, and an input disk 9 coupled to the input plate 6 through a loading cam 7 and fitted around the second input shaft 3 through a ball spline 8. The rotation force from the first input shaft 2 is transmitted sequentially to the input flange 5, input plate 6, loading cam 7, input disk 9, ball spline 8, and to the second input shaft 3.

A flange 3a is formed integrally at one end of the second input shaft 3 at the first input shaft 2 side, and a thrust bearing 11 is interposed between the flange 3a and the input plate 6, and a hollow cylinder 12 for covering the loading cam 7 is fixed to the input plate 6 and slidably in contact with the input disk 9, and a liquid chamber 13 is formed in the inside of the hollow cylinder 12, so that a movement force of the second input shaft 3 towards the first input shaft 2 side is made adjustable by a liquid pressure.

A first continuously variable transmission mechanism 20 and a second continuously variable transmission mechanism 30 are disposed on the second input shaft 3 aligned in an axial direction. The first continuously variable transmission mechanism 20 includes the input disk 9 having a toroid surface formed at the opposite side to the loading cam 7, an output disk 22 having a toroid surface similarly formed on an opposing surface to the input disk 9 and rotatably fitted around the second input shaft 3, a power roller 23 disposed in a toroid-like groove formed by the toroid surfaces of both the disks 9 and 22 so that the power roller 23 is frictionally in contact with both the disks 9 and 22, and a carrier 24 for rotatably supporting the power roller 23. The carrier 24 is formed by two rectangular frames which sandwich the power roller 23 at front and rear sides and which are tightened by a bolt or the like, and a rotary shaft portion 23a which is integral with the power roller 23 is rotatably supported by the two frames in the inside thereof through a bearing 25.

Also, the second continuously variable transmission mechanism 30, similar to the first continuously variable transmission mechanism 20, includes an input disk 31, output disk 32, power roller 33 carrier 34, and bearing 35. However, in contrast to the first continuously variable transmission mechanism 20, the input disk 31 which is fitted around the second input shaft 3 through a ball spline 14 is disposed at a far side from the first continuously variable transmission mechanism 20, and at the same time, the output disk 32 is disposed at a near side to the first continuously variable transmission mechanism 20, and furthermore, the input disk 31 is pressed and urged from its rear surface by a spring member, i.e., a belleville spring 16 seated on a washer face nut 15 screwed around the second input shaft 3. The other parts are the same as described as to the first continuously variable transmission mechanism 20. Due to the urging force of the belleville spring 16, the input disk 31 is urged to the output disk 32 side, and on the other hand, the input disk 9 is urged to the output disk 22 side through the washer face nut 15, second input shaft 3 its flange 3a, thrust bearing 11, input plate 6, and loading cam 7, thereby to exert an initial pre-pressure.

The output disks 22 and 32 are arranged back to back, and an output gear 19 has an inner periphery spline-coupled with an outer periphery of barrel portions 22a and 32a of the output disks 22 and 32, and the output gear 19 is supported through a bearing 18 by a gear housing 17 secured to the transmission housing 1. The output gear 19 is engaged at its outer periphery with a counter gear 41, and the counter gear 41 is rotatably supported by the gear housing 17 through a bearing 41a. One end of a counter shaft 42 is spline-coupled with the center of the counter gear 41, so that the counter gear 41 is rotated as a unit with the counter shaft 42. The other end of the counter shaft 42 is rotatably supported by the transmission housing 1 through a bearing 42a, and an output shaft 43 is coupled with an outer end portion of the counter shaft 42 so as to be rotated as a unit. In this respect, the counter shaft 42 substantially constitutes a part of the output shaft.

The above-mentioned set of the power roller 23 and the carrier 24 are disposed as three sets between the input disk 9 and the output disk 22 around the second input shaft 3 at equal intervals, and also the set of the power roller 33 and the carrier 34 are disposed as three sets between the input disk 31 and the output disk 32 around the second input shaft 3 at equal intervals. FIG. 2 shows in detail a mechanism for advancing and retracting each one carrier 24, 34 in a plane orthogonal to the rotary shaft 4 in FIG. 1.

Specifically, one end of the carrier 24 in the first continuously variable transmission mechanism 20 is formed with a hollow shaft portion 24a, and a base end of a carrier shaft 26 having a ball 26a formed at a tip end is fitted into the hollow shaft portion 24a and secured by a pin 26b. The axis line of the carrier shaft 26 forms a tilt and rotation axis 27 which passes through a shaft center of the rotary shaft portion 23a of the power roller 23, and this tilt and rotation axis 27 is slanted forming a caster angle θ with respect to the axis line 28 orthogonal to the rotary shaft 4. In the carrier 34 in the second continuously variable transmission mechanism 30, similarly, a carrier shaft 36 is also secured to the carrier 34, and a ball 36a is formed at the tree end the carrier shaft 36 and the structure is similar to that of the first continuously variable transmission mechanism 20. However, the tilt and rotation axis 37 of the power roller 33 in the second continuously variable transmission mechanism 30 is disposed symmetrically with the tilt and rotation axis 27 of the power roller 23 in the first continuously variable transmission mechanism 20 about the axis line (or orthogonal plane) orthogonal to the rotary shaft 4. Thus, the carriers 24 and 34 and carrier shafts 26 and 36 in the first continuously variable transmission mechanism 20 and in the second continuously variable transmission mechanism 30 are represented as having mirror image symmetry (left-right symmetry).

Figure 3:
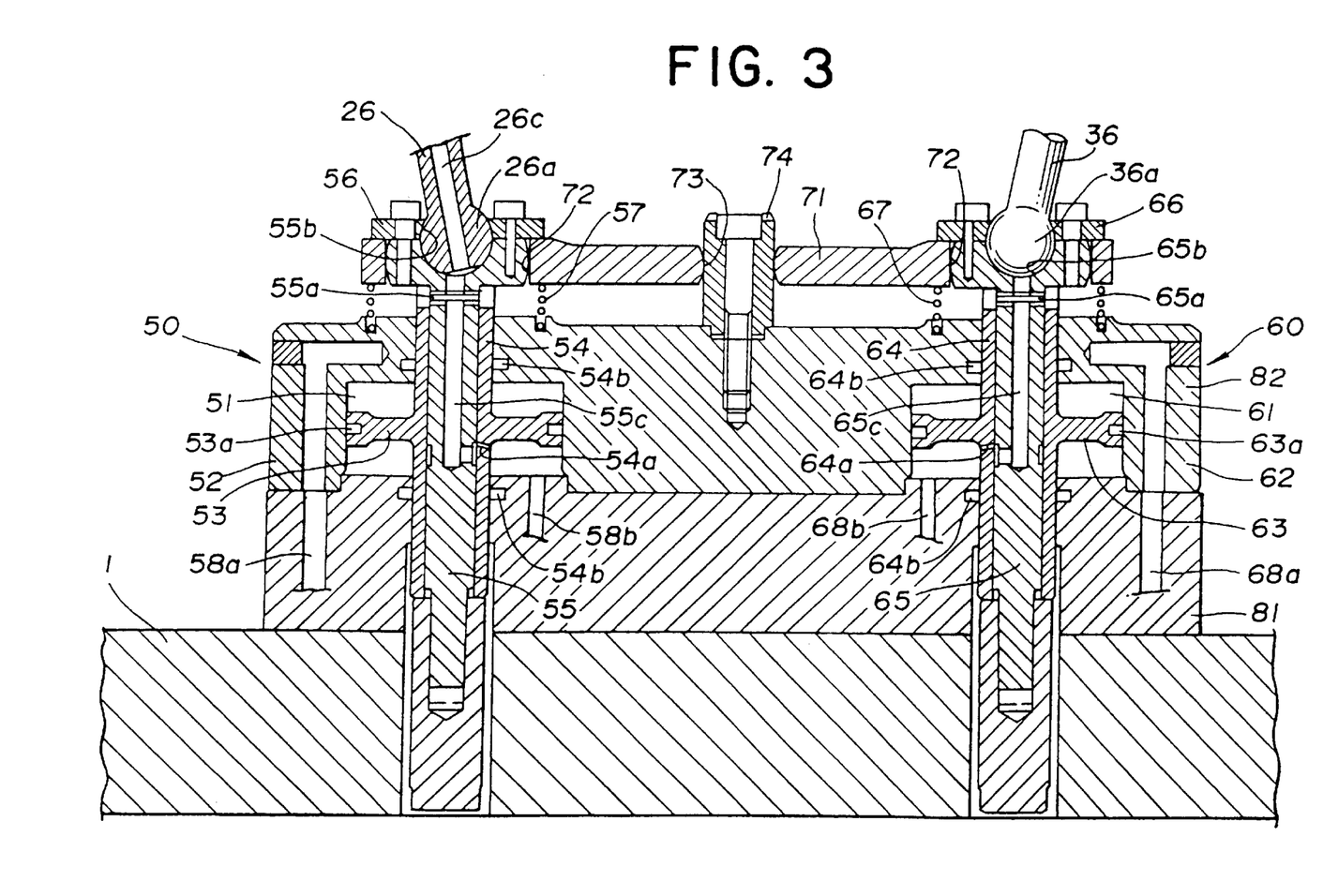
FIG. 3 is an enlarged view of a part of FIG. 2.

The carrier shafts 26 and 36 in the first and second continuously variable transmission mechanisms 20 and 30 are, as shown in the enlarged view in FIG. 3, individually connected to two cylinder devices 50 and 60. The first cylinder device 50 and the second cylinder device 60 have their axis lines orthogonal to the rotary shaft 4, and still they are orthogonal to a mounting surface for the cylinder devices 50 and 60 in the transmission housing 1. In other words, the above-mentioned mounting surface in the transmission housing 1 forms a plane containing a line which is in parallel to the rotary shaft 4, and a lower block 81 having its lower surface formed in a plane is mounted and secured to the plane of the transmission housing 1 by a bolt (not shown ) or the like, and an upper block 82 having two cylinder bores 51 and 61 is mounted and secured to an upper surface of the lower block 81 so that the cylinder bores 51 and 61 are blockaded by the lower block 81. In this manner, a cylinder body 52 of the first cylinder device 50 and a cylinder body 62 of the second cylinder device 60 are formed. Joining surfaces between the lower block 81 and the upper block 82 are also in parallel to the mounting surface in the transmission housing 1 and are orthogonal to the axis lines of the cylinder devices 50 and 60.

The axis lines of the cylinder bores 51 and 61 are orthogonal to the rotary shaft 4, and also, orthogonal to the mounting surface in the transmission housing 1 for the cylinder devices 50 and 60. Pistons 53 and 63 are slidably disposed in the inside of these cylinder bores 51 and 61. Furthermore, as shown in FIG. 3, hollow shaft portions 54 and 64 integral with the pistons 53 and 63 are slidably fitted into through holes of the cylinder bodies 52 and 62. Piston rods 55 and 65 are fitted into the hollow shaft portions 54 and 64, and the piston rods 55 and 65 and the hollow shaft portions 54 and 64 are secured by pins 55a and 65a.

Each piston rod 55, 65 has at its center of a head portion a concave spherical seat 55b, 65b for receiving the ball 26a, 36a of the carrier shaft 26, 36, and the carrier shaft 26, 36 and the piston rod 55, 65 are connected by this universal joint formed by a ball joint. Furthermore, an outer surface of the periphery of the head portion of each piston rod 55, 65 is made to be a spherical surface. This universal joint may be replaced by any well-known universal Joint of a mechanical element having different structure as the ball joint.

A link 71 which is in parallel to the rotary shaft 4 is mounted between the head potions of both the piston rods 55 and 65. Cylindrical holes 72 and 72 are formed at opposite end portions of the link 71, and the head portions of the piston rods 55 and 65 are fitted into the cylindrical holes 72 and 72, so that an angle between the axis line of the piston rod 55, 65 and the axis line of the link 71 is made variable.

About a half of the ball 26a, 36a of the carrier shaft 26, 36 is seated in the spherical seat of the piston rod 55, 65, and a slip-out preventing plate 56, 66 is applied to the upper surface of the head portion of the piston rod 55, 65 and fixed by a bolt so that the ball 26a, 36a is prevented from slipping out of the spherical seat 55b, 65b and the seated condition of the ball is maintained. Furthermore, the slip-out preventing plate 56, 66 covers the cylindrical hole 72, 72 of the link 71 and further extends outwardly onto the upper surface of the link 71 to prevent the link 71 from slipping out of the head portion of the piston rod 55, 65. On the other hand, an elastic member which is a coil spring 57, 67 is provided between the link 71 and the cylinder body 52, 62 around the piston rod 55, 65 in a compressed condition. The coil spring 57, 67 supports the link 71 and prevents the link 71 from slipping out of the head portion of the piston rod 55, 65 and falling by its own weight. Furthermore, the coil spring 57, 67 forms a dynamic damper of a mass-spring system by supporting the link 71 and by using the mass of the link 71 and each portion connected thereto.

Furthermore, a center hole 73 is formed at the longitudinal center of the link 71, and a vertical cylinder 74 inserted therethrough is fixed by a bolt on an upper surface of the upper block 82 so that the link 71 is movable upwardly and downwardly guided by the vertical cylinder 74. An inner wall surface of the center hole 73 is not cylindrical, but a cross section is in a shape of a drum with a center portion in a thickness direction has a small diameter and upper and lower portions have a large diameter. This shape allows the link 71 move in a seesaw motion about the cylinder 74.

The cylinder body 52, 62 has oil paths 58a, 58b, 68a, 68b connected to an oil pressure source and a control valve (not shown) to supply a pressure oil to each oil chamber partitioned by a piston 53, 63. Each rear (or lower) chamber is communicated with a throttle hole 26d at a tip end of an oil path 26c adjacent to the power roller 23 through a throttle hole 54a, 64a formed in the hollow shaft portion 54, 64, oil path 55c, 65c within the piston rod 55, 65, and an oil path 26c (not shown for the carrier shaft 36) within the carrier shaft 26, 36, and the pressure oil is sprayed from the throttle hole 26d to lubricate the outer periphery of the power roller 23, 33.

In each cylinder device 50, 60, a seal 54b, 64b is provided in the cylinder body 52, 62 between the hollow shaft 54, 64 and the cylinder body 52, 62, and also, a seal 53a, 63a is provided in an outer periphery of the piston 53, 63 between the cylinder body 52, 62 and the piston 53, 63 to ensure the liquid-tight property.

Next, in assembling the cylinder device 50, 60 of the full toroidal type continuously variable transmission shown in the drawings to the transmission housing 1, a mounting surface in the transmission housing 1 for mounting the cylinder device 50, 60 is made to be a plane, and a mounting surface in the lower block 81 onto the transmission housing 1 and a mounting surface in the lower block 81 for mounting the upper block 82 thereon, and a mounting surface in the upper block 82 for mounting on the lower block 81 are worked so as to be in parallel to one another and to be a plane. And also, the cylinder bore 51, 61 is worked so that its axis line is at right angles with respect to the above-mentioned planes, and the upper block and the lower block of the cylinder device 50, 60 may be assembled in the arrangement shown in the drawings in a condition that the piston rod 55, 65 has been assembled. Thus, since the mounting surfaces and the like of the cylinder body 52, 62 are only required to be worked to be parallel planes with respect to the transmission housing 1, the planes can be worked with high accuracy.

Furthermore, in this embodiment, since the two cylinder bores 51 and 61 are formed by the common lower block 81 and the upper block 82, not only the mounting of the cylinder bodies 52 and 62 onto the transmission housing 1 is easy but also there is no non-uniformity or variation in the mounting accuracy between both the cylinder bodies 52 and 62, and their mounting accuracy is improved.

The operation of this continuously variable transmission will be explained.

First, a rotation force from a rotation driving source is supplied to the first input shaft 2, and then transmitted to the input plate 6 through the input flange 5, and further transmitted to the input disk 9 through the loading cam 7. The rotation force of the input disk 9 is transmitted to the power roller 23 on one hand, it is transmitted to the second input shaft 3 through the ball spline 8, and this rotation force is also transmitted to the power roller 33 sequentially through the ball spline 14, and the input disk 31. Here, the input disk 9 presses the power roller 23 to the output disk 22 by a liquid pressure loaded to the loading cam 7 in addition to the initial pre-pressure by the belleville spring 16 fitted around the second input shaft 3, and also, due to a reaction force, the input plate 6 pulls the second input shaft 3 towards the first input shaft 2 through the thrust bearing 11. This thrust force is transmitted to the input disk 31 through the washer face nut 15, and belleville spring 16, and the input disk 31 presses the power roller 33 against the output disk 32. At this time, the pressing force of the input disk 31 to press the power roller 33 against the output disk 32 is equal to the pressing force of the input disk 9 to press the power roller 23 against the output disk 22. Furthermore, the axial forces in mutually opposite directions which acted on the output disks 22 and 32 by the power rollers 23 and 33 pressed individually are supported by the output gear 19.

In this manner, the rotation force transmitted from the first input shaft 2 is divided into two parts which are respectively exerted to the input disk 9 of the first continuously variable transmission mechanism 20 and to the input disk 31 of the second continuously variable transmission mechanism 30, and the divided parts of the rotation force are respectively transmitted to the output disks 22 and 32 from the input disks 9 and 31 through the power rollers 23 and 33 by traction drive. Here, by changing a contact position in a radial direction of power roller 23, 33 with the input disk 9, 31 and the output disk 22, 32, the rotation speed ratio between the input disk 9, 31 and the output disk 22, 32, that is, the gear ratio can be changed continuously. The outputs which achieved a required gear ratio are combined at the output gear 19, and it is supplied from the output shaft 43 through the counter gear 41, and a counter shaft 42.

Here, a traction force Ft acts on each power roller 23, 33 from the input disk 9, 31 side and from the output disk 22, 32 side respectively, and the total traction force acted on the power roller 23, 33 becomes 2 Ft. This force is transmitted to the piston 53, 63 via the bearing 25, 35, carrier 24, 34, carrier shaft 26, 36, and piston rod 55, 65.

The speed change (gear shift) is carried out in a relation between the above-mentioned force 2 Ft transmitted to the piston 53 and a thrust force of the piston 53 generated by the liquid pressure in the cylinder device 50. Specifically, when explaining as to the first continuously variable transmission mechanism 20, it the piston 53 of the cylinder device 50 is advanced or retracted, this movement force is transmitted to the power roller 23 through the piston rod 55, carrier shaft 26, and carrier 24, and the power roller 23 is moved in a direction of the axis line 28 which is orthogonal to the rotary shaft 4, thereby to displace from the rotary shaft 4, the shaft center of the rotary shaft portion 23a of the power roller 23 which intersects the rotary shaft 4. Then, since the tilt and rotation axis 27 of the power roller 23 has been given with the caster angle θ with respect to the axis line 28 which is orthogonal to the rotary shaft 4, as the power roller 23 tilts and rotates, its rotary shaft portion 23a is again intersected with the rotary shaft 4, and this condition is maintained. Here, the transmission gear ratio between the input disk 9 and the output disk 22 is increased or decreased in proportion to the amount of movement of the piston 53. The relation between the power roller 33 and the piston 63 in the second continuously variable transmission mechanism 30 is similar to that mentioned above.

Here, in the condition shown in FIG. 2, when the continuously variable transmission is operated without changing the gear ratio, the piston 53, 63 generates the same force Fp as the above-mentioned force 2 Ft due to a pressure difference between the front chamber and the rear chamber within the cylinder bore 51, 61, and this force is transmitted to the power roller 23, 33 through the piston rod 55, 65, carrier shaft 26, 36, and carrier 24, 34. The above-mentioned total traction force 2 Ft and the the thrust force Fp by the cylinder device 50 are identical, however, their action lines are respectively aligned to the tilt and rotation axis 27, 37 in the carrier 24. 34 and the carrier shaft 26, 36, and aligned to the axis line of the piston rod 55, 65 in the first cylinder device 50, second cylinder device 60. Accordingly, due to the fact that the above-mentioned action lines are intersecting, in the carrier shaft 26, 36, moment centered about the axis line of the power roller 23, 33 is generated, and this moment will act to slant the piston rod 55, 65 and the piston 53, 63. However, in FIG. 2, since the tilt and rotation axes 27 and 37 are symmetrical about the plane orthogonal to the rotary shaft 4, and also since the heads of the piston rods 55 and 65, which are respectively connected to the carrier shafts 26 and 36 are connected mutually by the link 71, the forces caused by the above-mentioned moment are exerted at the opposite ends of the link 71 in mutually the opposite directions and thus are cancelled out, so that the piston rod 55, 65 and the piston 53, 63 are not slanted. For this reason, it is possible to prevent the damage of the seals 53a, 54b, 63a, 64b of the cylinder device 50, 60. In addition, there is no tear of causing pinching between the cylinder body 52, 62, and the hollow shaft portion 54, 64.

Furthermore, since the periphery of the head portion of the piston rod 55, 65 has a spherical surface, and this head portion is fitted into the hole 72 of the link 71, and since the section of the center hole 73 which is fitted around the cylinder 74 has a drum shape and its contour has a circular arc shape, even when a deviation is caused in the positions of the piston rods 55 and 65 due to a cause in which the balance between the input and output forces in the cylinder devices 50 and 60 is lost, it is possible to absorb the deviation by supporting the input forces to the opposite end portions of the link 71 while the link 71 is slanting. As a result, the operation of both the cylinder devices 50 and 60 can be performed smoothly.

As described in the foregoing, in both the continuously variable transmission mechanisms 20 and 30, even when the movements or behaviors do not coincide between the carriers 24 and 34, and between the carrier shafts 26 and 36 or the like, the non-coincidence is absorbed by the movement of the link 71, and furthermore, even when the forces are exerted to slant the piston rods 55 and 65 in both the cylinder devices 50 and 60, these forces are supported by the link 71 and are cancelled out. Thus, the advancing and retracting operation by the pistons 53 and 63 can be performed smoothly.

Furthermore, since the dynamic damper of the mass-spring system is formed by supporting the link 71 by the coil springs 57 and 67, and by using the mass of the link 71 and respective portions connected to the link 71, the pulsation in the liquid pressure supplied to the cylinder devices 50 and 60, and vibrating forces due to the imbalance in the rotation of the power rollers 23 and 33 caused by a variation in the frictional force between the power rollers 23 and 33 and the input and output disks 6, 22 and 31, 32 can be damped by the dynamic damper.

Figure 4:
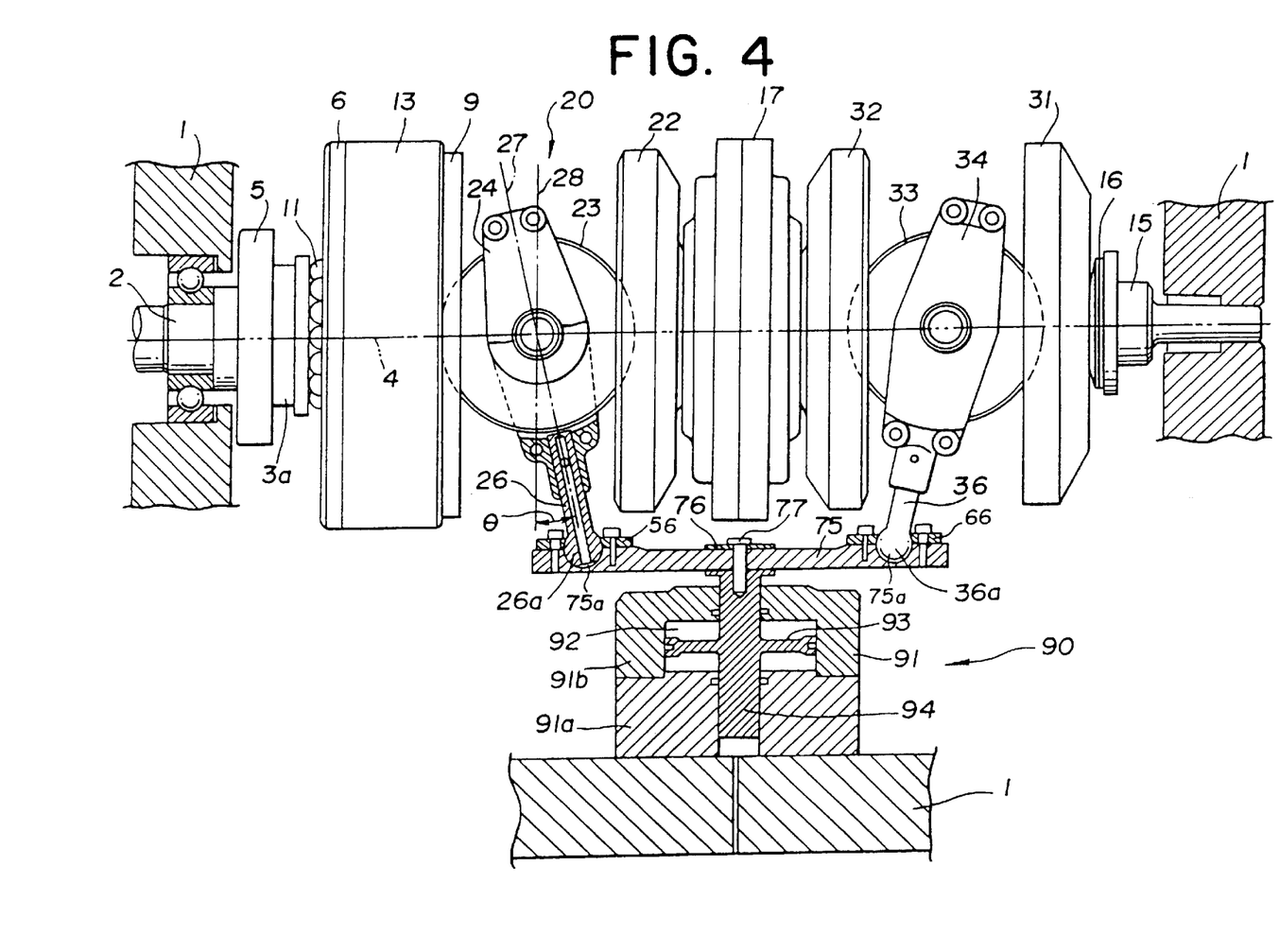
FIG. 4 is a partial front-sectional view of a full toroidal continuously variable transmission in another embodiment of the present invention.

FIG. 4 shows another embodiment in which in place of the two cylinder devices 50 and 60 shown in FIG. 2, a single cylinder device 90 is used.

Specifically, balls 26a and 36a of respective carrier shafts 26 and 36 of continuously variable transmission mechanisms 20 and 30 are seated on concave spherical seats 75a and 75a formed at opposite ends of a single link 75. Furthermore, the balls 26a and 36a are positioned by slip-out preventing plates 56 and 66, and a longitudinal center of the link 75 is fixed to a tip end of a piston rod 94 by using a holding plate 76 and a bolt 77.

A cylinder body 91 is constituted by a lower block 91a and an upper block 91b, and a cylinder bore 92 is formed by a recess in the upper block 91b and the lower block 91a. A piston 93 is shown as being integral with the piston rod 94, however, the piston 93 and the structure for mounting the piston 93 to the piston rod 94 may be achieved by using any well-known structure. In this case, the pressure receiving area of the piston 93 is made equal to the sum of the pressure receiving areas of the pistons 53 and 63.

In this embodiment, a mutual contact surface between the transmission housing 1 and the lower block 91a, and a mutual contact surface between the lower block 91a and the upper block 91b are made to be respectively planes, and these planes are at right angles to the axis orthogonal to the rotary shaft 4. Furthermore, the axis line of the cylinder bore 92 and the piston rod 94 are orthogonal to the above-mentioned contact surface of the transmission housing 1 and the rotary shaft 4. The other structures are the same as that of FIGS. 1 to 3, and hence the explanation is omitted.

Thus, in this embodiment, in addition to the advantage in the embodiment shown in FIGS. 1 and 2, another advantage is offered. That is, since the single cylinder device 90 is used to advance and retract the power rollers 23 and 33 of both the continuously variable transmission mechanisms 20 and 30, not only the advance and retract of the power roller 23 and the advance and retract of the power roller 33 can be synchronized with each other but also the structure is made to be simple by reducing the number of the cylinder devices and the liquid pressure mechanism for operating the cylinder device 90 becomes simple.

In each of the above embodiments, although the cylinder body 52, 62, 90 is constituted by the upper and lower blocks 82, 81 and 91b, 91a, the cylinder body 52, 62, 90 may be formed by combining other members so long as the cylinder bore 51, 61, 92 can be formed. Furthermore, in the above embodiments, although the cylinder body 52, 62, 90 is mounted on the transmission housing 1 at the rear end surface, that is, the surface at the opposite side to the piston rod protruding side, however, the cylinder body 52, 62, 90 may be mounted at its side surface on the transmission housing 1 depending on a shape of an inner surface of the transmission housing 1. In this case, the above-mentioned side surface of the cylinder body 52, 62, 90, and the mounting surface in the transmission housing 1 must be formed as a plane orthogonal to the rotary shaft 4.

In each embodiment described above, the present invention is applied to the full toroidal type continuously variable transmission, however, it is of course possible to apply the invention to a half toroidal type continuously variable transmission.

The present invention provides the following advantages.

In the first aspect of the invention, since it is only required to work each mounting surface of the transmission housing on which the cylinder device is mounted, to be at right angles or in parallel to the axis line of the cylinder device, there is no need to work a slant mounting surface which is difficult to work with high accuracy. Thus, since the cylinder device can be fixed by using as a reference, the plane which is at right angles or in parallel and which is easy to work with high accuracy, the position of the joint between the carrier shaft and the piston rod can be set accurately, and as a result, the tilt and rotation axis of the carrier can be set with high accuracy.

In the second aspect of the invention, since the joints of the two carrier shafts are connected mechanically by a link, the phases of both carriers which are respectively advanced and retracted in the planes between corresponding input and output disks can be synchronized with each other. Furthermore, since the tilt and rotation axes of both sets of input and output disks are mirror-symmetrical about the axis line orthogonal to the rotary shaft, the moment generated at each carrier shaft due to a difference in action lines of the traction force exerted on the power roller and the thrust force generated in the cylinder device in each set of input and output disks can be cancelled out by the moment produced in the other set of input and output disks at the link. As a result, since a bending force is not exerted on the piston rod, it is possible to prevent adverse effects on the cylinder device such as damage in the seal or the like.

In the third aspect of the invention, since a single cylinder device can be used to advance and retract respective power rollers of both sets of input and output disks, the structure becomes simple, and at the same time, the phases of both the carriers advanced and retracted by the cylinder device can be synchronized with each other.

In the fourth aspect of the invention, the vibrations caused by imbalance in rotation of the power rollers due to a pulsation in liquid pressure supplied to the cylinder device, and a frictional force variation between the power roller and the input and output disks can be attenuated by the dynamic damper.

In the fifth aspect of the invention, even when the axial forces of the carrier shafts are changed between both sets of input and output disks due to imbalance in the traction forces exerting on respective power rollers of both sets of input and output disks, this change can be absorbed by changing the angle between the joint and the link.

I claim:

1. A toroidal-type continuously variable transmission of the double-cavity type including two sets of input and output disks, each of the two sets of input and output disks comprising:

an input disk and an output disk disposed on a same axis of rotation;

a power roller disposed in a toroid-like groove formed by opposing surfaces of the input and output disks so that the power roller is frictionally in contact with both the input and output disks;

a carrier for rotatably supporting the power roller so that a tilt and rotation axis of the power roller is slanted by a predetermined angle with respect to an axis line orthogonal to said axis of rotation of the input and output disks; and a cylinder device for advancing and retracting the carrier in a plane orthogonal to said axis of rotation, wherein the cylinder device is disposed orthogonal to said axis of rotation of the input and output disks, and a carrier shaft mounted on the carrier along the tilt and rotation axis is coupled with a piston rod of the cylinder device by a joint.

2. A toroidal-type continuously variable transmission according to claim 1, wherein the tilt and rotation axis of the power roller of one set of input and output disks and the tilt and rotation axis of the power roller of the other set of input and output disks are disposed symmetrically about an axis line orthogonal to said axis of rotation of the input and output disks, and joints respectively connected to the carrier shafts of the two sets of input and output disks are coupled with each other by a link which is in parallel to said axis of rotation of the input and output disks.

3. A toroidal-type continuously variable transmission according to claim 1, wherein an elastic member is interposed between the link and the cylinder device to support the link thereby to form a dynamic damper utilizing mass of the link.

4. A toroidal-type continuously variable transmission according to claim 2, wherein the link is coupled with the joints so that an angle of the carrier shaft with respect to the link is made variable.

5. A toroidal-type continuously variable transmission according to claim 2, wherein an elastic member is interposed between the link and the cylinder device to support the link thereby to form a dynamic damper utilizing mass of the link.

6. A toroidal-type continuously variable transmission according to claim 3, wherein the link is coupled with the joints so that an angle of the carrier shaft with respect to the link is made variable.

7. A toroidal-type continuously variable transmission of the double-cavity type including two sets of input and output disks, each of the two sets of input and output disks comprising:

an input disk and an output disk disposed on a same axis of rotation;

a power roller disposed in a toroid-like groove formed by opposing surfaces of the input and output disks so that the power roller is frictionally in contact with both the input and output disks;

a carrier for rotatably supporting the power roller so that a tilt and rotation axis of the power roller is slanted by a predetermined angle with respect to an axis line orthogonal to said axis of rotation of the input and output disks, wherein respective tilt and rotation axes of the two sets of input and output disks are disposed symmetrically about an axis line orthogonal to said axis of rotation of the input and output disks, and joints which are respectively connected to carrier shafts of the two sets of input and output disks are coupled with a link in parallel to said axis of rotation of the input and output disks; and a cylinder device for advancing and retracting respective carriers of the two sets of input and output disks in a plane orthogonal to said axis rotation, said cylinder device connected to the link which is coupled to the carrier shafts.

8. A toroidal-type continuously variable transmission according to claim 7, wherein the link is coupled with the joints so that an angle of the carrier shaft with respect to the link is made variable.

9. A torroidal type continuously variable transmission according to claim 7, wherein an elastic member is interposed between the link and the cylinder device to support the link thereby to form a dynamic damper utilizing mass of the link.

10. A torroidal type continuously variable transmission according to claim 7, wherein phases of the carriers advanced and retracted by said cylinder device are synchronized with each other.

* * * * *